United States Patent [19]
Brieser et al.

[11] Patent Number: 4,772,074
[45] Date of Patent: Sep. 20, 1988

[54] DUAL WHEEL MOUNT ASSEMBLY

[75] Inventors: Gene R. Brieser, Oswego; Joseph P. Deschamps, Naperville; Paul G. Togami, Wheaton, all of Ill.

[73] Assignee: J. I. Case Company, Racine, Wis.

[21] Appl. No.: 900,331

[22] Filed: Aug. 25, 1986

[51] Int. Cl.$^4$ .............................................. B60B 1/00
[52] U.S. Cl. ........................... 301/9 DN; 301/36 R
[58] Field of Search ................. 301/9 DN, 36, 1, 5 B, 301/38

[56] References Cited

U.S. PATENT DOCUMENTS

| | | | |
|---|---|---|---|
| 1,618,887 | 2/1927 | Putnam | 301/9 DN |
| 1,637,666 | 4/1927 | Tarbox | 301/36 X |
| 1,721,313 | 7/1929 | Nelson | 301/9 DN |
| 1,812,005 | 6/1931 | Hunt | 301/9 DN |
| 2,107,925 | 2/1938 | Ash | 301/9 DN |
| 3,017,224 | 1/1962 | Palmer | 301/5 B |
| 3,207,557 | 9/1965 | Hunter | 301/5 B |

FOREIGN PATENT DOCUMENTS 129825 10/1932 Austria .............................. 301/36 R Primary Examiner—Richard J. Johnson
Attorney, Agent, or Firm—Dressler, Goldsmith, Shore, Sutker & Milnamow, Ltd.

[57] ABSTRACT

A dual wheel mount assembly is disclosed which is particularly suited for heavy implements such as agricultural combines or earth moving equipment. Inner and outer wheels of the assembly are interchangeable and formed with circumferentially spaced mounting holes which are alternately of a smaller diameter and a larger diameter. Retaining nuts are threaded only on the mounting bolts in the smaller diameter holes in the inner wheel to operationally secure the same. The outer wheel is mounted so that the larger diameter holes therein fit over the retaining nuts for the inner wheel. Outer retaining nuts are operationally threaded on all of the bolts, including those securing the inner wheel. Removal of the outer wheel thus may be accomplished without affecting the securement of the inner wheel.

1 Claim, 2 Drawing Sheets

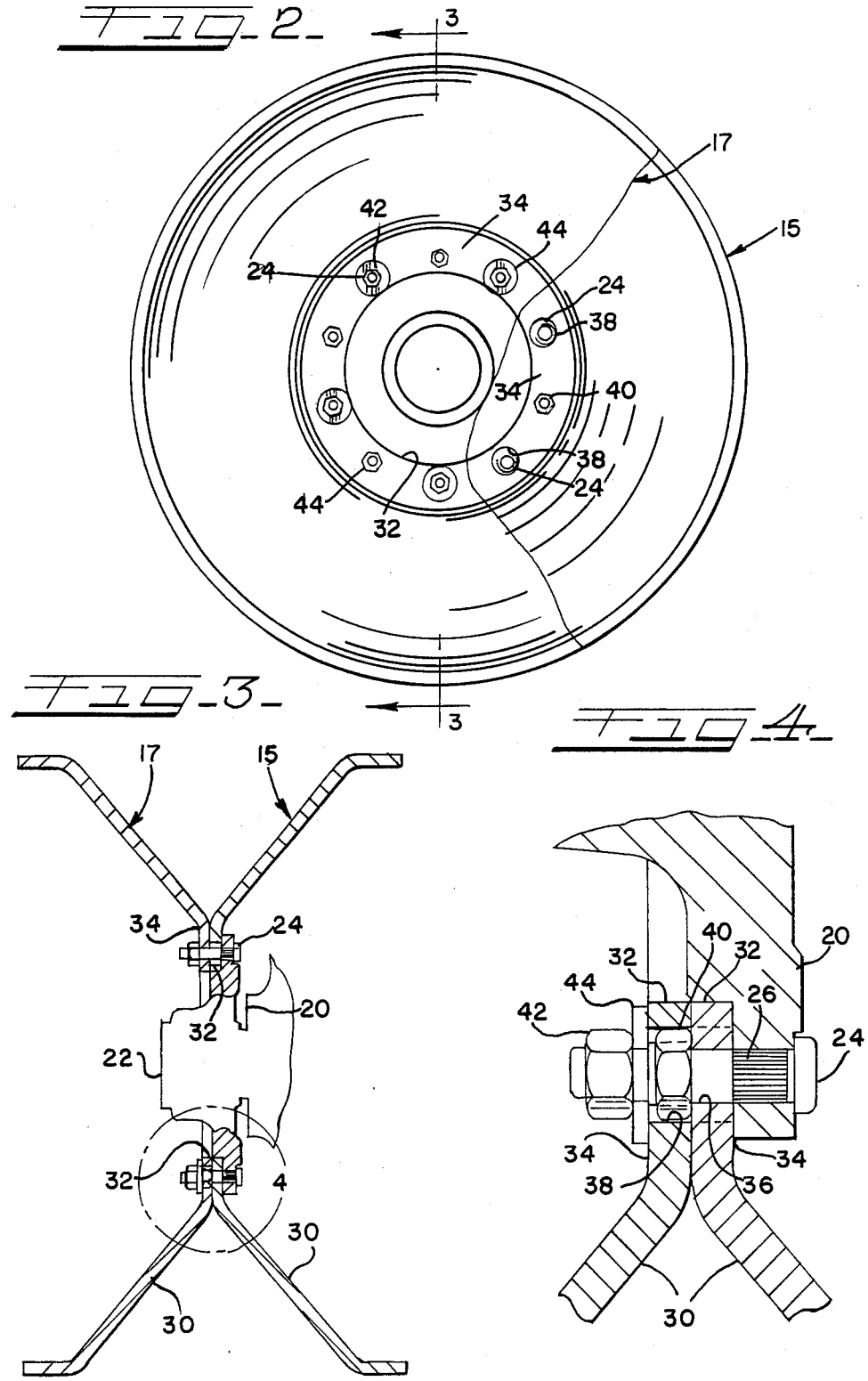

DUAL WHEEL MOUNT ASSEMBLY

TECHNICAL FIELD

This invention relates generally to the mounting of wheels on large driven implements, such as agricultural tractors and combines, and more particularly to an arrangement for efficiently mounting and dismounting dual wheels on such implements.

BACKGROUND OF THE INVENTION

Heavy duty agricultural, earth moving and construction implements frequently are equipped with dual wheels on one or more axles thereof. In the case of agricultural implements, dual wheels may be required not only for weight considerations, but also for stability and the desired row spacing during certain operations such as ridge planting, row crop harvesting, harvesting in muddy fields, operating over a stubble-strewn field, and the like. Generally, such dual wheels and their tires are massive in size and weight, thereby creating difficult problems in the handling, mounting and dismounting thereof.

In a conventional wheel mount, the drive drums or flanges at the extremities of the axle of the implement are provided with a plurality of outwardly projecting studs or bolts arranged in a generally circular pattern. The hub of the wheel to be mounted is formed with an equal number of similarly arranged holes adapted to be positioned over the bolts. Nuts are tightened on the bolts to secure the operationally mounted wheel. In the case of dual wheels, the same bolts and nuts typically are employed to operationally mount both of the hubs of an associated pair of wheels. It is also known in the prior art to utilize various adaptors between dual wheels whereby the adaptor is first connected to the inner wheel and/or the axle drum and the outer wheel is then connected to the adaptor.

Frequently, it is desirable or necessary to mount and/or dismount only the outer wheel of the dual wheels. For example, when an agricultural implement is used for certain ridge planting or row harvesting operations, it can be desirable to mount the outer wheels since they are spaced a known distance from the inner wheels, which distance is related to the width of crop rows or furrows. On the other hand, when it is required that the implement travel over smooth roads, be transported by truck or trailer, or be parked in a limited space enclosure, it can become desirable or necessary to remove the outer one of the dual wheels.

Given the massiveness of the wheels typically used on larger agricultural equipment, repeated mounting and/or dismounting of the wheels is difficult and inconvenient, and may even result in damage to the implement. In this regard, it will be appreciated that removal of the nuts when dismounting the outer wheel in the conventional mounting arrangement also typically causes loosening and freeing of the inner wheel. All of the nuts must thereafter be re-applied and tightened in order to secure the inner wheel for further use of the implement. Additionally, removal and installation of wheels over the bolts can cause damage to the threads of the bolts. The use of adaptors is obviously not completely satisfactory because it adds to the number of parts, complexity, and cost of the wheel assembly.

Further, some previous constructions have required that both of the dual wheels be placed in an unloaded condition to permit loosening and/or removal of the mounting bolts to effect mounting or dismounting of the outer wheel. Naturally, this can further complicate the mounting procedure, since it becomes necessary to jack up the implement to relieve the load on the wheels. This procedure is not only time-consuming and inconvenient, it requires use of a suitably sized jack which may not be readily available in the field.

There thus exists a need for an arrangement which facilitates simple and efficient mounting and dismounting of dual wheels on large agricultural implements or the like.

SUMMARY OF THE INVENTION

The present invention provides an arrangement for mounting dual wheels which eliminates or substantially reduces the above-described problems encountered with conventional dual wheel mounts.

Briefly, the invention comprises a plurality of threaded mounting bolts fixedly mounted on a drive drum or flange of an implement axle which are arranged in a circumferentially spaced array to define a circle. The number of bolts may be greater than that typically found in a conventional wheel mounting, and there are preferably an even number of the mounting bolts.

Each of the wheels comprises a generally frusto-conical hub having a central opening for accommodating the central portion of the axle drum therethrough. Each wheel hub is provided with a plurality of bolt-receiving holes around the central opening equal in number to the number of mounting bolts. The bolt-receiving holes are alternately of a first diameter, sufficient to receive a bolt therethrough, and a second relatively larger diameter, sufficient to receive a mounting nut therein.

The inner wheel is mounted by applying nuts to alternate bolts in the smaller diameter holes, i.e., to only one-half of the total number of bolts. The outer wheel is mounted by aligning its large-diameter holes with the nuts so that said nuts are received in the holes. Nuts are then applied to all of the mounting bolts, including those already having nuts operationally threaded thereon. When removal or dismounting of the outer wheel is desired, all of the outermost series of nuts may be removed without affecting or loosening the operational mounting of the inner wheel.

The wheels of a dual pair are mounted with the apices of their generally frusto-conical hubs in abutting opposed relationship to afford the desired spacing between the implement tires. However, since all of the wheels are of a uniform construction, they are readily interchangeable for use as outer or inner wheels of a pair or for mounting on either side of the implement axle.

Numerous other features and advantages of the present invention will become readily apparent from the following detailed description of the invention, from the claims, and from the accompanying drawings.

BRIEF DESCRIPTION OF THE DRAWINGS

In the accompanying drawings forming a part of the specification, and in which like numerals are employed to designate like parts throughout.

FIG. 2 is an enlarged end elevational view with the implement tires removed and portions of the outer wheel broken away;

FIG. 3 is a sectional view on the plane of line 3—3 in FIG. 2; and

FIG. 4 is an enlarged detail view of the circled area indicated in FIG. 3.

DETAILED DESCRIPTION OF THE INVENTION

Figure 1:
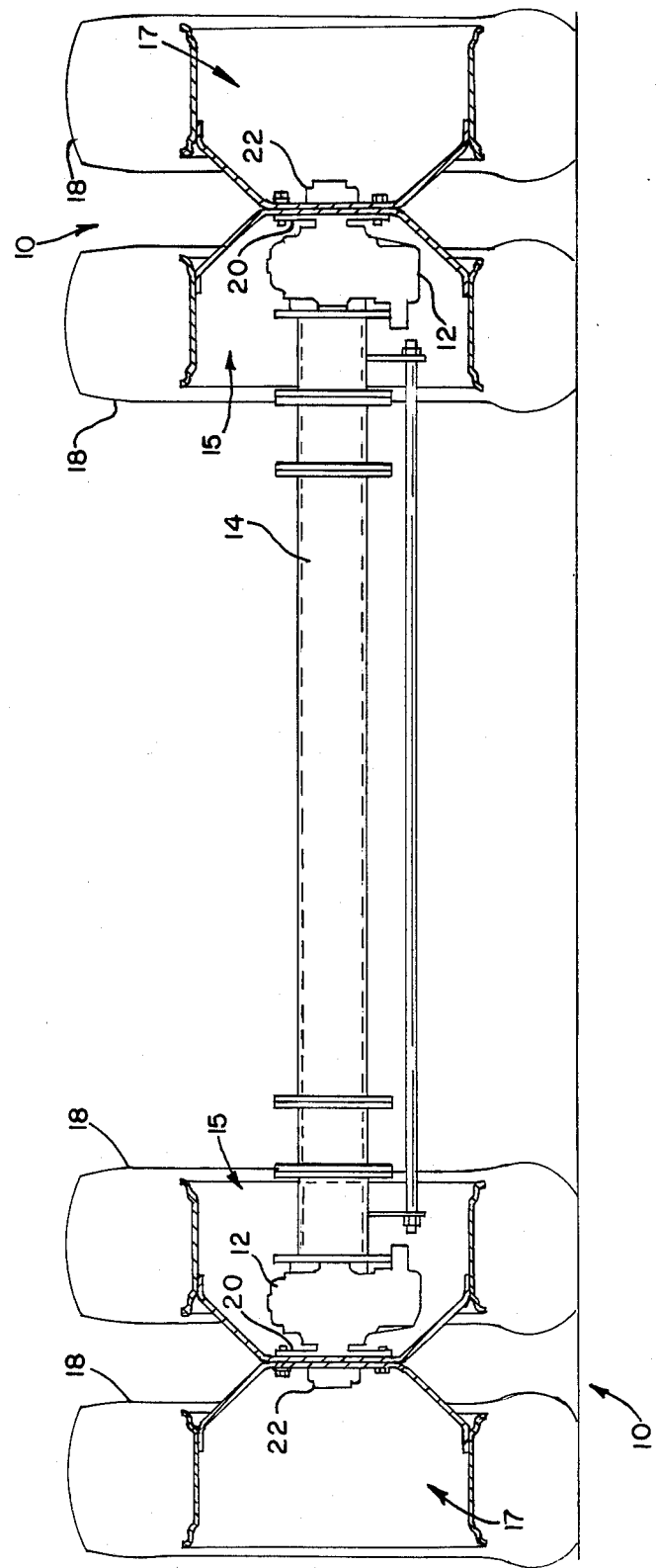
FIG. 1 is a vertical elevational view illustrating dual wheels operationally mounted on each end of the drive axle of an agricultural implement, with portions of the tires and wheels removed to show the connected wheel hubs.

While the present invention is susceptible of embodiment in various forms, there is shown in the drawings and will hereinafter be described a presently preferred embodiment, with the understanding that the present disclosure is to be considered as an exemplification of the invention and is not intended to limit the invention to the specific embodiment illustrated.

Referring with greater particularity to the drawings, it will be seen that the reference numeral 10 indicates generally a dual wheel mounting arrangement embodying the principles of the invention. A wheel mount 10 is shown operationally mounted to a drum 12 at each end of an axle 14 of an associated agricultural implement (not shown). Each wheel mount 10 comprises an inner wheel 15 and an outer wheel 17, said wheels carrying tires such as 18.

The wheel drum 12 comprises a mounting flange portion 20 and an outwardly extending central portion 22. A plurality of threaded mounting studs or bolts 24 are carried in fixed, circumferentially spaced relationship by the flange portion 20. The mounting bolts preferably comprise serrated segments 26 or other suitable tooth-like projections, and are thereby press-fitted and secured in openings formed in the flange portion (see FIG. 4). Preferably, bolts 24 comprise an even number thereof for reasons which will become apparent as the description proceeds; and in the embodiment illustrated, there are ten bolts 24, although a lesser or greater even number can also be employed.

Turning now to FIGS. 2 through 4, it will be seen that wheels 15 and 17 are identical in construction, each comprising a generally frusto-conical hub 30 having a central, drum receiving opening 32 formed therein and an annular mounting flange 34. Each mounting flange 34 is provided with ten circumferential holes corresponding in number and spacing to the ten bolts 24. It is important to note that said holes comprise five holes 36 of a relatively smaller, first diameter, and five holes 38 of a relatively larger, second diameter, said holes 36 and 38 being alternately arranged around the flange.

The inner wheel 15 is mounted by positioning its ten holes 36 and 38 over the ten bolts 24. Inner mounting nuts 40 are then threaded over the five bolts 24 in the first diameter holes 36 to secure the inner wheel to the axle 14. The outer wheel 17 is mounted by aligning its second larger diameter holes 38 with the nut-secured bolts 24 when positioning its ten holes 36 and 38 over the ten bolts 24. Stated otherwise, the small and large holes 36 and 38 of the outer wheel 17 are out of phase or in misalignment with the same holes in the inner wheel 15.

In this arrangement, it will be noted that the five inner mounting nuts 40 are received within the larger diameter holes 38 of the outer wheel 17 so that the flanges 34 of the two wheels are retained in closely-fitting, face-to-face contact. The bolts 24 are sufficiently long to extend beyond the mounting flange 34 of said outer wheel, and a second or outer mounting nut 42 and a washer 44 are then operationally applied to each of the bolts 24 to which inner nuts 40 have been applied. Outer holding nuts 42 are likewise applied to the remaining bolts 24, with washers preferably applied first although use of washers is optional because the smaller diameter holes 36 are involved.

When it is desired to dismount the outer wheel 17, the ten outer nuts 42 are removed whereupon said outer wheel is free for removal. This operation may be readily carried out by driving the inner wheels 15 onto appropriately spaced ramps or boards, (as may be readily available in the field) or with the use of jacks. In any event, it will be noted that removal of the outer wheel 17 does not affect the operational securement of the inner wheel 15 so that use of the implement may continue without further manipulation of the inner wheel or the inner nuts 40 securing the same. It will also be noted that the five bolts 24 which carry the inner mounting nuts 40 and secure the inner wheel 15 are relatively shielded from thread damage because the smaller diameter holes 36 of the outer wheel 17 are not required to be positioned thereover.

The identical construction of the inner and outer wheels 15 and 17 enables them to be interchangeable or mountable on either side of the implement. At the same time, the invention comprises a reduction in the number of parts compared to prior dual wheel arrangements.

It will be readily appreciated from the foregoing detailed description of the invention and illustrative embodiment thereof that numerous variations and modifications may be effected without departing from the true spirit and scope of the novel concept of the principles of the invention.

What is claimed is:

1. A dual wheel mount assembly for an axle of an implement comprising:
    an even number of circumferentially arranged threaded bolts fixedly mounted on the axle and projecting laterally outwardly therefrom;
    an inner wheel and an outer wheel operationally mounted on said threaded bolts,
    each of said wheels comprising a central annular mounting flange having an even number of circumferentially arranged generally cylindrical holes formed in said flange and positioned over said bolts,
    one-half of said holes being of a larger diameter;
    inner mounting nuts operationally threaded only on the bolts positioned in the smaller diameter holes for operationally securing said inner wheel, the larger diameter holes of said outer wheel being positioned over and receiving totally within said larger holes said inner mounting nuts;
    outer mounting nuts operationally threaded on all of said bolts and operationally securing said outer wheel, and a washer operationally retained over each of the larger diameter holes in said outer wheel by said outer mounting nuts; whereby removal of said outer holding nuts permits dismounting of said outer wheel without affecting the operational securement of said inner wheel.

* * * * *